Feb. 13, 1968  H. TRUAX  3,368,475
MACHINE FOR TREATING SOYBEANS AND THE LIKE
Original Filed Oct. 19, 1966  2 Sheets-Sheet 1
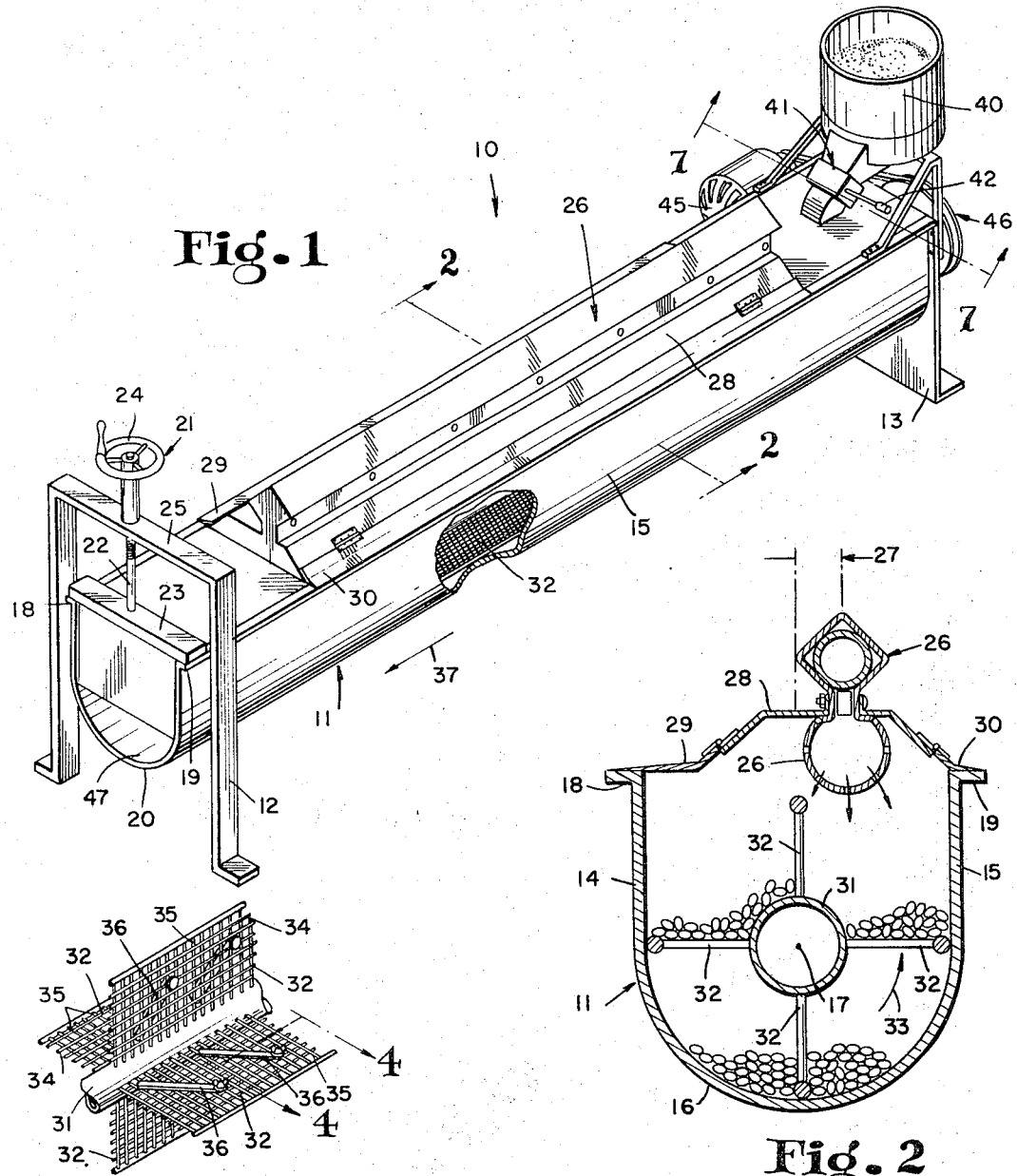
INVENTOR.
HARRY TRUAX
BY
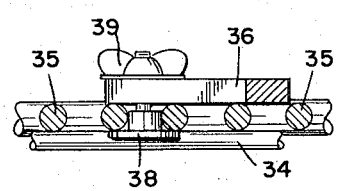
ATTORNEYS

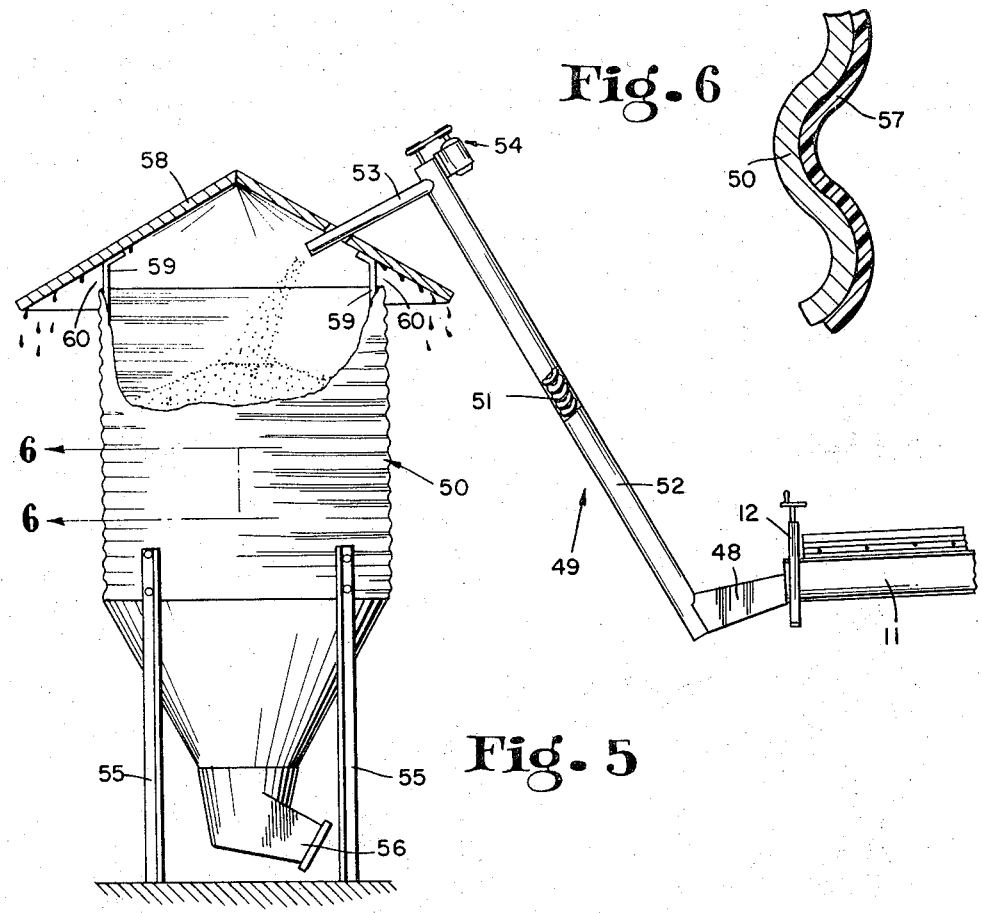

United States Patent Office 3,368,475
Patented Feb. 13, 1968

3,368,475
MACHINE FOR TREATING SOYBEANS
AND THE LIKE
Harry Truax, Morgan County, near Mooresville, Ind.,
assignor to Harry Truax & Sons Company, Inc.,
Mooresville, Ind., a corporation of Indiana
Original application Oct. 19, 1966, Ser. No. 587,811, now
Patent No. 3,343,961, dated Sept. 26, 1967. Divided and
this application Mar. 31, 1967, Ser. No. 627,369
15 Claims. (Cl. 99—235)

ABSTRACT OF THE DISCLOSURE

A machine for treating heat sensitive, granular, organic materials, such as soybeans and the like, utilizing an infrared energy source and a storage means having sufficiently low thermal conductivity to permit thermal equilibration in the materials by their residually generated heat. The granular materials are intermittently cascaded in close proximity to the energy source until they reach a predetermined temperature and, then, the materials are transferred to the storage means. Means are provided for transferring the materials to the storage means without permitting any significant decrease in temperature of the materials.

---

This application is a divisional application based on my copending application Ser. No. 587,811 filed Oct. 19, 1966, now Patent No. 3,343,961.

The present invention relates generally to a machine for treating granular organic material and, more particularly, to a machine for treating whole unextracted soybeans to render them more palatable and nutritious by destroying the bitter and deleterious constituents contained therein.

Raw soybeans contain proteolytic enzyme inhibitors which contribute to the unpalatability of raw soybeans as well as hinder proper digestion. Thus, farmers cannot feed raw soybeans to poultry and livestock. The general practice has been to harvest and ship the raw soybeans to a centralized processing plant where the oil is removed, after which the residual meal is returned to the farmer either as soybean meal or in a manufactured feed. Usually, the oil is removed by solvent extraction processes. In such extraction processes, the soybeans are subjected to temperatures which destroy the aforementioned proteolytic enzyme inhibitors.

In previous times, the oil content of soybeans was the chief and most profitable reason for their production. The high protein soybean meal which resulted from the oil extraction processes was merely a by-product which could be fed to poultry and livestock. As farmers learned the feeding value of soybean meal, the demand for it grew. At the same time, rapid technological changes in agriculture made it more profitable to expand soybean acreage in the United States, thereby providing a plentiful supply of soybean oil. This situation has led to the use of fats and oils by the feed industry in huge amounts in livestock and poultry feeds to prevent dustiness, wear and tear on the feed processing machinery, and losses caused by wind wastage.

Since soybean oil is two and one fourth times more valuable for nutritional purposes than the carbohydrates in soybeans, a more dense and higher energy food can be made using soybean oil. Reference "Utilization of Fats in Poultry and Livestock Rations," Utilization Report No. 2, United States Department of Agriculture, ARS.

The present invention provides a machine for treating soybeans and the like in the condition which they are harvested and on each individual farm. Thus, the present invention eliminates the need for farmers to send all of their soybeans to a large processing plant. Each farmer can thereby obtain a considerable saving by processing his own soybeans as they are harvested, or as they are needed, thereby saving transportation costs, storage costs and all other incidental expenses connected with shipping soybeans to a central processing plant. In addition, soybeans treated by the method of the present invention can be readily used by the farmer as livestock and poultry feed.

The economic advantages of the present invention have been well substantiated by research. For instance, United States Department of Agriculture Bulletin ERS 228, dated March 1965, discloses on page 6, in Table 1, that with prices prevailing at the time the reported survey was made, an Arkansas farmer would save $16.51 per ton, a Delaware farmer would save $28.40 per ton, a Georgia farmer would save $21.50 per ton and an Ohio farmer would save $26.86 per ton by using such a machine and method.

It is an object of the present invention, therefore, to provide a machine for processing soybeans and other heat sensitive organic materials that is simple, durable and of low initial cost and that is usable at, or near, the farm. Thus, a livestock or poultry feeder, in a soybean production area, can provide himself with livestock and poultry feed vastly superior to raw soybeans and equal to or better than commercial plant proteins available to him otherwise, without incurring all of the above-mentioned expenses. It is also an object of the present invention to provide a method for treating soybeans in such a machine.

It is another object of the present invention to provide a machine for treating soybeans using a high intensity infra-red heat source without causing denaturing of the protein or case hardening of the soybean while improving the organoleptic and nutritional properties of raw soybeans.

It is another object of the present invention to provide in an apparatus for treating granular materials, a means for intermittently exposing the granular material to a high intensity infra-red energy source at a predetermined frequency and for a predetermined length of time.

It is a further object of the present invention to provide, in an apparatus for treating granular materials, a storage means having sufficiently low thermal conductivity to permit thermal equilibration within said material by its residually generated heat.

It is still another object of the present invention to provide a machine for treating raw soybeans to destroy all of the deleterious materials contained therein without impairing the nutritional value of the soybeans.

Other objects and features of the present invention will become apparent as this specification progresses.

To the accomplishment of the above and related objects, the present invention may be embodied in the form illustrated in the accompanying drawings, and in the process steps described, attention being called to the fact, however, that the drawings are illustrative only, and that change may be made in the specific construction illustrated and in the specific procedures described, so long as the scope of the appended claims is not violated.

In the drawings:

FIG. 1 is a perspective view of an apparatus for treating soybeans and the like in accordance with the practice of the present invention;

FIG. 2 is a sectional view taken from FIG. 1 generally along the lines 2—2 and illustrating a rotary vane means for cascading soybeans and the like near an infra-red heat source;

FIG. 3 is a fragmentary view of the rotary vane means and illustrating the structure thereof;

FIG. 4 is a sectional view taken from FIG. 3 generally along the lines 4—4 and greatly enlarged to illustrate a means for moving the soybeans in a direction toward the exit of the apparatus illustrated in FIG. 1;

FIG. 5 is a fragmentary view to a much smaller scale, illustrating the combination of the apparatus shown in FIG. 1 and a means for storing soybeans and the like after they are treated in said apparatus;

FIG. 6 is a sectional view taken from FIG. 5 generally along the lines 6—6 and illustrating a thermal-insulating coating applied to the storing means illustrated in FIG. 5;

FIG. 7 is a sectional view taken from FIG. 1 generally along the lines 7—7 and illustrating a means for controlling the flow of soybeans and the like into the apparatus shown in FIG. 1; and FIG. 8 is a diagram illustrating the heat equilibration of soybeans and the like when they are stored in the means illustrated in FIG. 5.

Generally speaking, the present invention is a machine for treating heat sensitive granular materials, such as soybeans and the like. The machine of the present invention is comprised of a trough for containing the granular materials. An infra-red energy source is mounted above the trough and arranged to extend therealong. There is a means rotatably mounted on an axis extending through and along said trough for cascading the material contained in said trough in close proximity to the infra-red energy source. There is a means for driving the aforementioned cascading means. There is a means for introducing the granular material into said trough and for removing said granular material from the trough without permitting a substantial reduction in the temperature of the material. A storage means is provided for receiving the materials from the aforementioned removing means. The aforementioned storage means has a sufficiently low thermal conductivity to permit thermal equilibration within the material by its residually generated heat.

The method of the present invention comprises the steps of rapidly and intermittently cascading soybeans into close proximity to an infra-red energy source until the teguments of the soybeans are ruptured by vapor pressure generated internally to the teguments. Immediately, at that point the soybeans are placed into a storage means without permitting any substantial decrease in temperature of the soybeans and the soybeans are stored in the storage means until all of the deleterious materials contained therein are destroyed. In the practice of the present invention, the aforementioned infra-red energy source is maintained from 1800° F. to 2500° F. Generally, the soybeans are held in the aforementioned storage means from one to ten hours. In the practice of the present invention, the infra-red energy source may be gas fired and the products of combustion emanating from the energy source may be contained in the environment surrounding the soybeans. In the practice of the present invention, it may be desirable to maintain the aforementioned environment containing the products of combustion at about 400° F. while said infra-red energy source is maintained from 1800° F. to 2500° F.

Referring now to the drawings, a machine for treating soybeans in accordance with the practice of the present invention can be visualized in conjunction with the following description. The apparatus for treating soybeans in accordance with the practice of the present invention, indicated generally by the reference number 10, is comprised of a trough 11 supported at the ends by support means 12 and 13. The shape of the trough 11 is shown clearly in FIG. 2. Referring to FIG. 2, it can be seen that the trough 11 is U-shaped in cross-section and has vertically upwardly extending sides 14 and 15. The lower part of the trough 11, indicated by the reference number 16, is cylindrically formed about an axis represented by the reference number 17. There is a pair of flanges 18 and 19 extending outwardly from the uppermost portions of the sides 15 and 16, respectively.

Referring again to FIG. 1, it can be seen that the support means 12 is connected to the end 20 of the trough 11 by a vertically adjustable means indicated generally by the reference number 21. The vertically adjustable means 21 includes a threaded shaft 22 having one end swivelly connected to a member 23 secured to the trough 11 and the other end threadedly received in an internally threaded crank means 24. The shaft 22 extends through a hole in a cross member 25 of the support means 12 upon which the crank means 24 is supported. Therefore, by rotating the crank means 24, the end 20 of the trough 11 is raised or lowered with respect to the cross member 25. The aforementioned member 23 is connected to the flanges 18 and 19 of the trough 11.

There is an infra-red heat source, indicated generally by the reference number 26, mounted above the trough as is shown in FIGS. 1 and 2. The infra-red heat source 26 found most desirable for the practice of the present invention is of the type having a radiant grid 26' made of high temperature heat resisting metal which is heated to incandescence by an internal flame produced by combustion of pre-mixed gas and air in the proper proportions. In FIG. 2, it can be seen that the radiant grid is cylindrical in shape and is offset laterally with respect to the axis 17 by distance represented by the reference number 27. There is a reflector means 28 arranged to reflect the generated radiant energy into the trough 11. Infra-red heaters of the type discussed above are well known in the art and need not be discussed in detail in this specification.

There is a pair of adjustable ventilators 29 and 30 hinged to the shield means 28 as is shown in FIG. 1 and FIG. 2. The ventilators 29 and 30 are provided as a ventilation means for controlling the ambient conditions within the trough 11.

There is a shaft means 31 rotatably supported in the trough 11 on an axis substantially coincident with the axis 17. A plurality of radially outwardly directed vanes 32 is mounted on the shaft 31. It can be seen in FIGS. 2 and 3 of the accompanying drawing that there are four such vanes in the embodiment illustrated therein. In FIG. 2, it can be seen that the radial dimension of the vanes 32 is such that the vanes just barely clear the trough 11 and the radiant grid 26' when said vanes are rotated in the direction of the arrow 33. Therefore, when the vanes 32 are rotated in the direction of the arrow 33, beans contained in the trough 11 are picked up by the vanes and cascaded in close proximity to the radiant grid 26'.

Referring now to FIG. 3, it can be seen that the vanes 32 are preferably fabricated in the form of a grid. The grid consists of axially extending wires 34 and radially extending wires 35 arranged to form openings small enough to prevent passage of soybeans therethrough but large enough to permit transmission of radiant energy therethrough and to attenuate convection. The wires 34 and 35 are generally round and stiff in order to utilize Fresnel diffraction and Cornu spiral pulsating effects of infra-red rays emanating from the radiant grid 26'. Calculations indicate that a rotating grid of the type described herein will provide peak pulses up to 40,000 B.t.u. per hour per square foot for a burner intensity of 25,000 B.t.u. per hour per square foot of surface. Thus, the radiant flux is diffracted to increase the effective intensity of the pulse which gives deeper penetration. The general cross section of the wires 35 is shown clearly in FIG. 4.

There are adjustable deflector means, indicated by the reference number 36, mounted on each of the vanes 32 and arranged to cause movement of the soybeans in the direction of the arrow 37 in the trough 11. In FIG. 4, it can be seen that the adjustable deflector means 36 are connected to the vanes 32 by headed screws 38 and wing nuts 39. There is a hopper means 40 mounted on the support means 13 for the trough 11. The hopper 40 is arranged to feed soybeans or the like into the trough 11 through a chute means, indicated generally by the reference number 41, including manual means 42 for controlling the rate of flow of soybeans into trough 11. In FIG. 7, it can be seen that the manual means 42 for controlling the rate of flow is essentially a means for varying the effective area of an opening 43 in the chute means 41. Thus, when the handle associated with the manual means 42 is rotated in the direction of the arrow 44 the opening 43 is made larger to increase the flow of soybeans.

There is a motor means 45 connected by a belt and pulley means, indicated generally by the reference number 46, to the shaft means 31. The motor means 45 is, therefore, a means for rotating the vanes 32 in the direction of the arrow 33. The speed of rotation of the vanes 32 is determined by the processing requirement for the soybeans and the like treated in the apparatus shown in FIG. 1.

There is an exit opening 47 in the end 20 of the trough 11. In FIG. 5, it can be seen that the exit opening 47 is arranged to feed into a second hopper means 48 which is a part of an elevator means, indicated generally by the reference number 49, for transferring soybeans and the like from the trough 11 to a post treatment storage bin 50. The elevator means 49 is of the type having an auger 51 arranged in a closed tube 52 for elevating particles deposited into a hopper, such as the hopper means 48, a predetermined height depending on the length of the auger. A tube 53 is connected to the tube 52 and arranged to feed elevated soybeans into the post treatment storage bin 50.

There is a driving means, indicated generally by the reference number 54, for the auger 51.

It is to be noted that soybeans and the like are not exposed to the air after they are heat treated in the trough 11. Thus, the hopper means 48, tube 52, and tube 53 are all closed. The reason for not exposing the soybeans to the air after they are treated in the trough 11 will become apparent as this specification progresses.

The bin 50, which is supported on stands 55, is similar to many corrugated metal bins typically used by farmers to store grain. The grain is loaded at the top and removed from the bin through a chute 56 shown at the bottom of the bin. However, modifications to such bins are required for the practice of the present invention. One of such modifications is shown in the sectional view of FIG. 6.

It can be seen in FIG. 6 that a plastic coating 57 has been applied on the interior surfaces of the wall of the bin to decrease the thermal conductivity of the metal wall. The plastic coating may be epoxy resin or any other plastic which will decrease suitably the thermal conductivity of the wall. Preferably, the plastic coating should be of light color to reflect heat.

As another modification, a special roof 58 has been mounted on the bin 50 as shown in FIG. 5. The roof 58 is held above the bin by members 59 so as to leave a space, indicated by the reference number 60, around the top of the bin. It can also be seen that the roof 58 extends out and away from the bin 50 so that condensation on the underneath side of the roof will not fall back onto the material stored in the bin. The reason for this feature will also become apparent as this specification progresses.

With the above structural description in mind, and by making reference to the drawing figures, the following analysis of operation will serve to convey the functional details of the apparatus for treating soybeans and the like.

Soybeans deposited into the hopper 40 are fed into the trough 11 through the chute means 41. The rate of movement of soybeans through the trough 11 to the exit opening 47 is determined by the speed of rotation of the vanes 32, position of the adjustable deflector means 36 and the height of the trough 11 at the end 20. Therefore, the amount of time that each soybean spends in the trough 11 and, consequently, the amount of time each soybean is subjected to the infra-red radiation, can be determined. Of course, the manual means 42 must be adjusted to maintain a constant flow of soybeans into the trough 11. After the soybeans are treated in the trough 11, they are fed into the hopper 48 whence they are continuously elevated by the auger 51 to the tube 53. The treated soybeans are fed into the bin 50 through the tube 53 and are held there for a predetermined amount of time.

Referring to FIG. 2, it can be seen that soybeans moving through the trough 11 are cascaded in close proximity to the radiant grid 26'. Therefore, each soybean is intermittently subjected to the intense radiation in the area surrounding the grid 26'. Using an apparatus such as described and illustrated in this application, it is possible to assure that each soybean passing through the trough 11 receives a predetermined number of exposures of a predetermined length of time. For instance, an apparatus of the type described which is 10 feet long and which has six inch vanes can be adjusted so that soybeans passing therethrough receive twenty to twenty-five exposures of from ½ to 1 second duration high intensity infra-red energy pulses during a period of 360 seconds. Therefore, in this example, each soybean is exposed directly to the infra-red energy source for about twenty seconds out of the total time that it is in the trough 11. In the fifteen seconds between successive exposures, the soybeans are cascaded through the gaseous atmosphere in the apparatus so as to be cooled by convection and back radiation. Obviously, there is also an equalization of internal temperatures in the soybeans by conduction between pulses.

Of course, the temperature of the radiant grid 26' and the amount of time that each soybean is subjected to the temperature of the radiant grid 26' must be determined for the type of soybean being processed and the end product desired. It has been found, however, that infra-red heat sources having temperature ranges between 1800° F. and 2500° F. are completely satisfactory in the machine of the present invention.

The cascading of soybeans by the rotating vanes 32 is an attractive feature of the machine of the present invention because the cascading action removes opaque films formed on the soybeans. The removal of opaque films necessarily increases the efficiency with which each bean is heated by radiant energy transfer. Also, the cascading action assures that all sides of the bean will be subjected to the infra-red radiation.

It has been found that placement of the radiant grid 26' off-center as is shown in FIG. 2, provides the maximum exposure of the maximum number of beans during the shortest period of time. It can be seen that the radiant grid 26' is positioned laterally with respect to a vertical plane running through and extending along the axis 17 to provide the optimum radiation directed toward a horizontal plane extending outwardly from the axis 17 to the wall 15.

It is important that no appreciable drop in temperature of the soybeans occurs during the movement of the soybeans from the trough 11 to the bin 50. Therefore, the auger 51 must be driven at a speed which assures a minimum temperature drop of the soybeans.

After the infra-red treated soybeans are deposited into the bin 50, they are held there to cook in their residually generated heat. Thus, the plastic coating 57 must provide sufficient thermal insulation to retard rapid cooling of the soybeans deposited in the bin 50. Specifically, the plastic coating 57 must provide a sufficiently low thermal conductivity to permit thermal equilibration in the soybeans by residually generated heat.

In the practice of the present invention, soybeans are heated in an apparatus of the type described above until enough vapor is accumulated beneath the dense, tough tegument to provide a pressure differential which will finally rupture the tegument. Upon rupture of the tegument, the soybeans are moved without cooling into a bin having generally low thermal conductivity. The heat already generated inside the soybean is retained in the storage bin and provides strong thermal vibration within each soybean. It is necessary to retain the heat within each soybean for a predetermined period of time because the thermal reaction of some of the destructive enzymes is reversible and if the soybeans are cooled quickly after the heat treatment, many of the destructive enzymes will not be permanently destroyed. For example, urease will not be permanently destroyed if the soybeans are cooled too quickly. In general, soybeans which have been heat treated by the method of the present invention must be stored without substantial heat loss for at least one hour and may be held without deliberate cooling for ten to twelve hours. If more than one ton of soybeans is stored and has not cooled within ten to twelve hours, the soybeans may require forced cooling. For instance, a blower means could be connected to the lower part of a bin, such as the bin 50, to aerate the soybeans contained therein until they reach substantially ambient temperature.

The above described method of using residual heat in a post treatment bin assures that there is no overheating of the soybeans. During the tempering period in the storage bin, thermal energy is conducted to the centers of the soybeans. In addition, the entire soybean is cooked evenly to a desired color with a minimum of protein and amino acid destruction. The resulting color of soybeans is determined by the exposure time in the heat treating machine.

During the infra-red heat treatment portion of the method of the present invention, the soybeans are intermittently exposed to a high radiant flux at a frequency which will not permit scorching of the tegument. The intermittent exposing of soybeans to a high radiant flux is achieved easily by cascading the soybeans in close proximity to an infra-red heating source maintained at from 1800° F. to 2500° F. Moisture evaporated from the inside of the soybean combines with carbon dioxide to form an opaque film on the surface of the soybean, and the cascading action tends to remove the film to permit efficient radiant energy transfer to the soybeans.

In the practice of the present invention, it is necessary to control the amount of time that the soybeans are continuously exposed to the high energy infra-red source. Specifically, it has been found that over exposure causes denaturing of the protein, case hardening or toughening of the tegument and impairing of the organoleptic and nutritional properties of the soybeans. In the practice of the present invention, using the principle of pulsating with a high energy source, the soybeans can be heat treated in four to eight minutes depending on the size of the soybeans which differs with various varieties and environmental growing conditions. The time of four to eight minutes is in contrast to the time of thirty to sixty minutes required for heat treating soybeans using steam as in contemporary methods.

The case hardening or toughening of the tegument is undesirable because the deleterious materials in legumes, such as soybeans, are in the cytoplasm between the cells rather than in the body of the cells. Thus, the deleterious materials can be removed by internal steam distillation if the cotyledons are not toughened or sealed by coagulation of protein contained therein. The tegument of a soybean, which is a tough, dense carbohydrate material, functions as a small autoclave to collect steam therein until enough vapor pressure is generated to rupture the walls. As the vapor escapes, the deleterious materials, such as the bitter and toxic materials which prevent normal growth in poultry and livestock, are carried thereby. Consequently, if the periphery of the cotyledon is case hardened or toughened so that rupture cannot occur, the deleterious materials will be trapped within the soybean.

Observations using an electron microscope show that rupturing of the tegument by the method of the present invention creates radial passageways or channels which permit migration of moisture which acts to distill and remove the undesirable proteolytic enzyme inhibitors.

When heat treating soybeans by the method of the present invention, it is desirable to control the environment within the chamber of the heat treating machine. It is to be noted that ventilators 29 and 30 have been provided on the apparatus 10 to control the environment within the trough 11.

The use of intermittently applied infra-red energy by the machine and method of the present invention results in a weakening of the molecular linkages or bonds within the soybean which releases the enzyme inhibitors. Specifically, radiation is generated by the inherent vibration or rotation of atoms or molecules in any material maintained at temperatures above absolute zero. This molecular oscillation involves variations in electrical charges which give off electromagnetic energy which is primarily absorbed by water. It is believed that molecular oscillation in soybeans treated by the method of the present invention is enhanced by the occurrence of a phenomenon usually referred to as intumescence. Specifically, a heat retardant coating of water vapor is developed directly under the tegument to retard the surface evaporation speed to the point that it is slower than the diffusion rate from the center of the soybean. Thus, the center of the soybean is heat treated evenly before the outer surface is overheated and sealed.

It is further believed that the vapor accumulated under the tegument keeps the protein in a moist environment until the tegument is ruptured. The aforementioned trapped water vapor has an affinity for infra-red radiance and, therefore, pulsing tends to distribute the flux more evenly through the bean.

It has been found in the practice of the present invention that the rate of cooling due to evaporation is reduced after the tegument is ruptured and, consequently, the temperature of the exterior of the soybean rises very rapidly. It is important, therefore, to discharge the soybeans from the heat treating machine as soon after the rupture as possible in order to prevent overcooking. The residual heat in the soybean when the tegument ruptures, if preserved, is sufficient to finish the cooking needed to prevent reversion of the enzyme inhibitors and to obtain an even heat transfer to the center of the soybean without overheating, congealing, coagulating or otherwise contributing to the denaturing or destruction of the protein.

The exact time and temperature required for heat treating soybeans using the machine and method of the present invention cannot be exactly stated because experience, to date, indicates that these factors depend on the moisture content of the soybean as well as the size. However, it has been found that soybeans having a moisture content of about 9% to 13% can be heat treated satisfactorily using the following described machine and method. The heat treating machine is like the described machine 10 having six inch wide vanes mounted on a shaft driven at speeds of 30 to 40 r.p.m. The soybeans are passed through the machine and are cascaded from twenty to twenty-five times in close proximity, about one inch, to the infra-red energy source. The total time in the machine is approximately 360 seconds. The soybeans are then removed from the heat treating machine and quickly placed in a post treatment storage bin, such as the previously described bin 50, where they are held for at least one hour.

In order to establish proper temperatures for practicing the method of the present invention, the following relationship, which is shown graphically in FIG. 8, is provided.

Three temperatures must either be measured or extrapolated. The first temperature, hereinafter referred to as T1, is the absolute temperature of soybeans prior to processing. For all practical purposes $T1$ will be the ambient temperature corrected to absolute. The next temperature, hereinafter referred to as $T2$, is the absolute temperature of the soybeans taken immediately after exit from the heat treating machine. The third temperature, hereinafter referred to as $T3$, is the absolute extrapolated maximum equilibrium temperature during storage of the soybeans in the post treatment storage bin. $T3$ is extrapolated from the crossing of the lines 61 and 62 shown in FIG. 8. Line 61 represents the heat loss due to internal conduction and line 62 represents the total heat lost in the post treatment storage bin. It has been determined from feeding tests that $T2/T3$ ratios must be maintained between 1.01 and 1.15 and that $T1/T2$ ratios may vary between .605 and .815. It has also been determined that the $T1/T2$ ratios are not as critical as the $T2/T3$ ratios.

In order to main the $T2/T3$ ratios within the 1.01 and 1.15 limit, T2 can be lowered considerably below the temperature which would scorch the soybean as long as it is sufficient to rupture the teguments. Of course, T2 is determined by the size of the soybeans, moisture content, atmospheric pressure, variety of soybeans, conditions of the hull, etc. T3 can be varied by many obvious means, such as varying the thermal conductivity of the storage bin, to assist in meeting the required $T2/T3$ ratios.

From the foregoing discussion, it can be seen that the time required for heat treating soybeans in a machine, such as the machine 10, can be reduced greatly because the soybeans do not have to reach a state of thermal equilibrium while they are in the machine. Thus, the soybeans heat soak in a bin where time is not critical.

In the practice of the present invention, it may be desirable to vary the $T2/T3$ ratios slightly in order to obtain an end product having a desired color. For instance, the darker brown product has a more "nutty" flavor than the light brown product and, at times, it may be desirable to vary the color to gain palatability at the expense of slightly more protein denaturing. Thus, a chicken, having no taste buds, can utilize a light brown product which has been barely detoxified while young pigs weighing less than 75 pounds and humans prefer a product having a distinct "nutty" flavor. A medium color is more desirable for feeding cattle.

Heretofore, one of the growth limiting factors of the protein in soybeans has been the retention of methionine in the digestive tract. By proper use of time and temperature in the practice of the present invention, methionine, an amino acid, is released from some of its chemical linkages and is made available for nutrition before it is expelled in the feces. Optimum utiliaztion of proteins requires that the essential amino acids must not only be available for absorption, but must be liberated during digestion at rates permitting their mutual supplementation. In the practice of the present invention, the intermittently applied infra-red energy weakens the molecular bonds to make the methionine more available to the nutritional pool of other amino acids.

In addition to debittering and destroying the antitrypsin factor, the method of the present invention deactivates lipoxidase, an enzyme having properties which oxidize unsaturated fats. This is a significant feature because the whole soybean contains 18% to 20% unsaturated fats which add significantly to the caloric value of soybeans. Also, scientists have definitely shown that the nutrition value of protein is diminished when fed with oxidized fat.

Contemporary methods of processing soybeans involve rolling or otherwise crushing segments of soybeans, which have been softened by steam, to rupture each oil cell. Thus, the lipoxidase is in intimate contact with the unsaturated oils and fats of the soybeans and tends to convert them into peroxides. The unstable intermediate products oxidize the carotenoid pigments or Vitamin A in the oils and fats. Lipoxidase also starts a destructive action of fat oxidation which is accelerated by the addition of steam in the presence of elevated temperature and oxygen. In contrast, the whole soybean is treated in the practice of the present invention and the lipoxidase is deactivated by the infra-red heat before it comes into contact with the unsaturated oils and fats contained in the soybean. The soybeans are not ground, rolled or mixed in any manner until they have been completely heat treated. Soybeans treated by the method of the present invention may be kept intact for relatively lengthy periods of time before they are processed and mixed with other ingredients into animal food. Thus, the full nutritional value of the oil is preserved. Since the oil cells have not been ruptured or broken by the method of the present invention, the oil is not affected by the lipoxidase because it has been deactivated nor is it exposed to the ravages of oxygen. It is well known that oxygen deteriorates the food value of the oil and makes it rancid and unpalatable.

It is also well known that oleic, ricinoleic, linoleic and linolenic acids and their esters absorb oxygen rapidly in the presence of lipoxidase. Since linoleic and linolenic acids are especially valuable in nutrition, deactivation of the lipoxidase protects the nutritional value of these materials.

The value of soybeans treated by the method of the present invention is illustrated by the results of a test performed by the Wisconsin Alumni Research Foundation, which is tabulated in Table I, and a test performed by the College of Agriculture of the University of Arkansas which is tabulated in Table II.

TABLE I

| 10 Rats per Group | Raw Whole Soybeans | Soybeans Treated by Method of Present Invention |
| --- | --- | --- |
| Initial weight (grams) | 45.7 | 45.9 |
| Final weight (grams) | 38.4 | 137.4 |
| Gain (grams) | −7.3 | 91.5 |
| Feed consumed (grams) | 145.0 | 380.09 |
| Pancreatic weight (grams) | .098 | .059 |

The pancreatic weights shown in Table I indicate that the proteolytic enzyme inhibitor in the soybeans treated by the method of the present invention has been destroyed or reduced to such a low level that it is not measurable. This is the substance of the conclusion drawn by the Wisconsin Alumni Research Foundation.

TABLE II

| Test Group of Chickens Through Four Weeks | Raw Whole Soybeans | Soybeans Treated by Method of Present Invention |
| --- | --- | --- |
| Average weight gain (grams) | 356.0 | 429.0 |
| Average feed efficiency | *2.12 | *1.70 |

* Indicates ratio of weight of soybeans fed to weight gain of chickens.

The feed efficiency ratings shown in Table II indicate that soybeans treated by the method of the present invention are significantly better for growth purposes than raw soybeans.

What is claimed is:

1. Apparatus for treating heat sensitive, granular materials comprising a trough for containing said materials, an infra-red energy source mounted above said trough and extending therealong, means for cascading said material contained in said trough in close proximity to said infra-red energy source, said cascading means being rotatably mounted on an axis extending through and along said trough, means for driving said cascading means, means for introducing said granular material into said trough, means for removing said granular material from said trough without permitting a significant reduction in temperature of said material, and storage means for receiving said material from said removing means, said storage means having sufficiently low thermal conductivity to permit thermal equilibration within said material by its residually generated heat.

2. Apparatus as in claim 1 wherein said cascading means comprises a plurality of rotatably mounted radially extending vanes.

3. Apparatus as in claim 2 wherein said vanes are constructed of a wire grid having openings of a size which will prevent passage of said granular material therethrough.

4. Apparatus as in claim 3 wherein the wire of said grid is generally round and stiff in order to utilize Fresnel diffraction and Cornu spiral pulsating effects of infra-red rays emanating from said infra-red energy source.

5. Apparatus as in claim 1 wherein said infra-red energy source is capable of maintaining temperatures up to 2500° F.

6. Apparatus as in claim 1 wherein said means for introducing said granular material into said trough includes a hopper means mounted above and adjacent a first end of said trough, said hopper means being arranged to provide a controlled and continuous flow of said granular material to said trough and wherein said means for removing said granular material from said trough includes adjustable deflector means mounted on said cascading means, said adjustable deflector means being arranged to urge said granular material toward an opening adjacent a second end of said trough when said cascading means is rotated.

7. Apparatus as in claim 1 wherein said storage means comprises a metal bin having a plastic coating on the inside surfaces thereof, said plastic coating being of sufficient thickness to significantly lower the thermal conductivity of the walls of said bin, and a roof for said bin, said roof being constructed and arranged to transport condensing vapors originating from said granular material stored in said bin away from the interior of said bin.

8. Apparatus for treating granular materials comprising a trough having a cylindrically shaped bottom portion and vertically extending sides, said bottom portion being formed about an axis substantially centered between said vertically extending sides, a shaft means rotatably mounted on an axis substantially coincident with said first mentioned axis, an elongated infra-red energy source mounted above said trough and extending substantially parallel to said first mentioned axis, reflector means associated with said energy source, said reflector means being arranged to reflect radiant energy toward the space defined by said bottom portion and said walls of said trough, a plurality of radially extending vanes mounted on said shaft means, said vanes having a radial dimension such that said granular material is picked up from the bottom of said trough and cascaded in close proximity to said infra-red energy source when said shaft means is rotated, adjustable ventilation means for controlling the ambient condition within said space defined by said bottom portion and walls of said trough, means for driving said shaft means at a predetermined speed and in a predetermined direction, means for introducing said granular material into said trough, means for removing said granular material from said trough without permitting a substantial reduction in temperature of said material, and storage means for receiving said material from said removing means, said storage means having sufficiently low thermal conductivity to permit thermal equilibration within said material by its residually generated heat.

9. Apparatus as in claim 8 wherein said vanes are constructed of a wire grid having openings of a size which will prevent passage of said granular material therethrough, the wire of said grid being generally round and stiff in order to utilize Fresnel diffraction and Cornu spiral pulsating effects of infra-red rays emanating from said infra-red energy source.

10. Apparatus as in claim 8 wherein said adjustable ventilation means includes a ventilator pivotally connected to each side of said reflector means and extending therealong, said ventilators being arranged to adjustably close the space between each side of said reflector means and the adjacent wall of said trough.

11. Apparatus as in claim 8 wherein said infra-red energy source is a gas fired source capable of maintaining temperatures up to 2500° F. and wherein said adjustable ventilation means is arranged to contain the combustion products of said gas fired source within said trough to control the temperature of said space defined by said bottom portion and walls of said trough.

12. Apparatus as in claim 8 wherein said means for introducing said granular material into said trough includes a hopper means mounted above and at a first end of said trough, said hopper means being arranged to provide a controlled and continuous flow of said granular material to said trough and wherein said means for removing said granular material from said trough includes adjustable deflector means mounted on said vanes, said adjustable deflector means being arranged to urge said granular material toward an opening in the second end of said trough when said vanes are rotated.

13. Apparatus as in claim 8 including adjustable means for raising and lowering said second end of said trough to control the movement of said granular material therethrough.

14. Apparatus as in claim 8 wherein said infra-red energy source is laterally offset with respect to a vertical plane including said first mentioned axis to provide a maximum amount of radiation directed toward a horizontal plane extending from said first mentioned axis outwardly to one of said vertically extending walls which is closer to said infra-red source.

15. Apparatus as in claim 8 wherein said storage means comprises a metal bin having a plastic coating on the inside surfaces thereof, said plastic coating being of sufficient thickness to significantly lower the thermal conductivity of the walls of said bin, and a roof for said bin, said roof being arranged to prevent condensing vapors originating from said granular material stored in said bin from falling back into said material.

References Cited

UNITED STATES PATENTS

| | | | |
|---|---|---|---|
| 2,575,426 | 11/1951 | Parnell | 99—253 |
| 2,617,351 | 11/1952 | Graham | 99—235 |
| 2,722,171 | 11/1955 | Deringer | 99—235 |
| 3,092,503 | 6/1963 | Gray | 99—249 X |

ROBERT W. JENKINS, *Primary Examiner.*